Feb. 28, 1950        G. B. GLASS        2,498,672

MOTOR DRIVE FOR MEDICAL SYRINGES

Filed May 26, 1947        3 Sheets-Sheet 1

INVENTOR:

Feb. 28, 1950     G. B. GLASS     2,498,672
MOTOR DRIVE FOR MEDICAL SYRINGES
Filed May 26, 1947     3 Sheets-Sheet 2
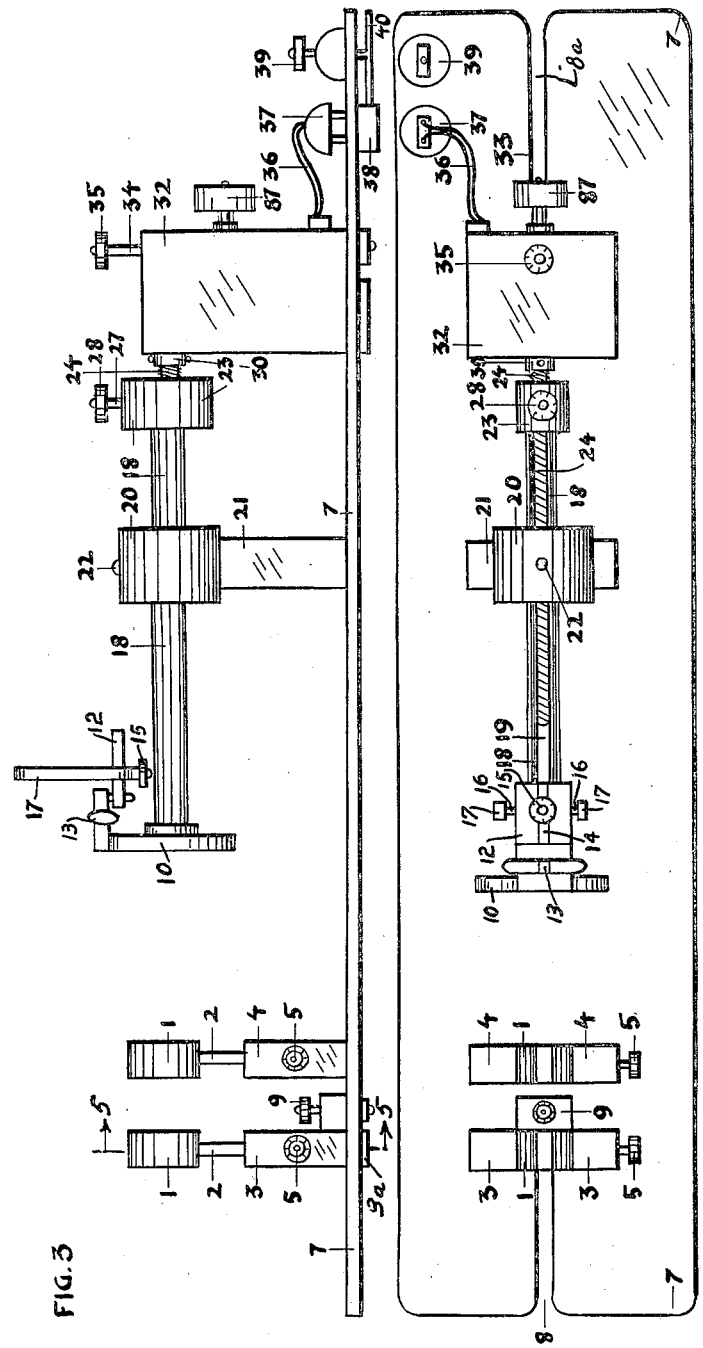

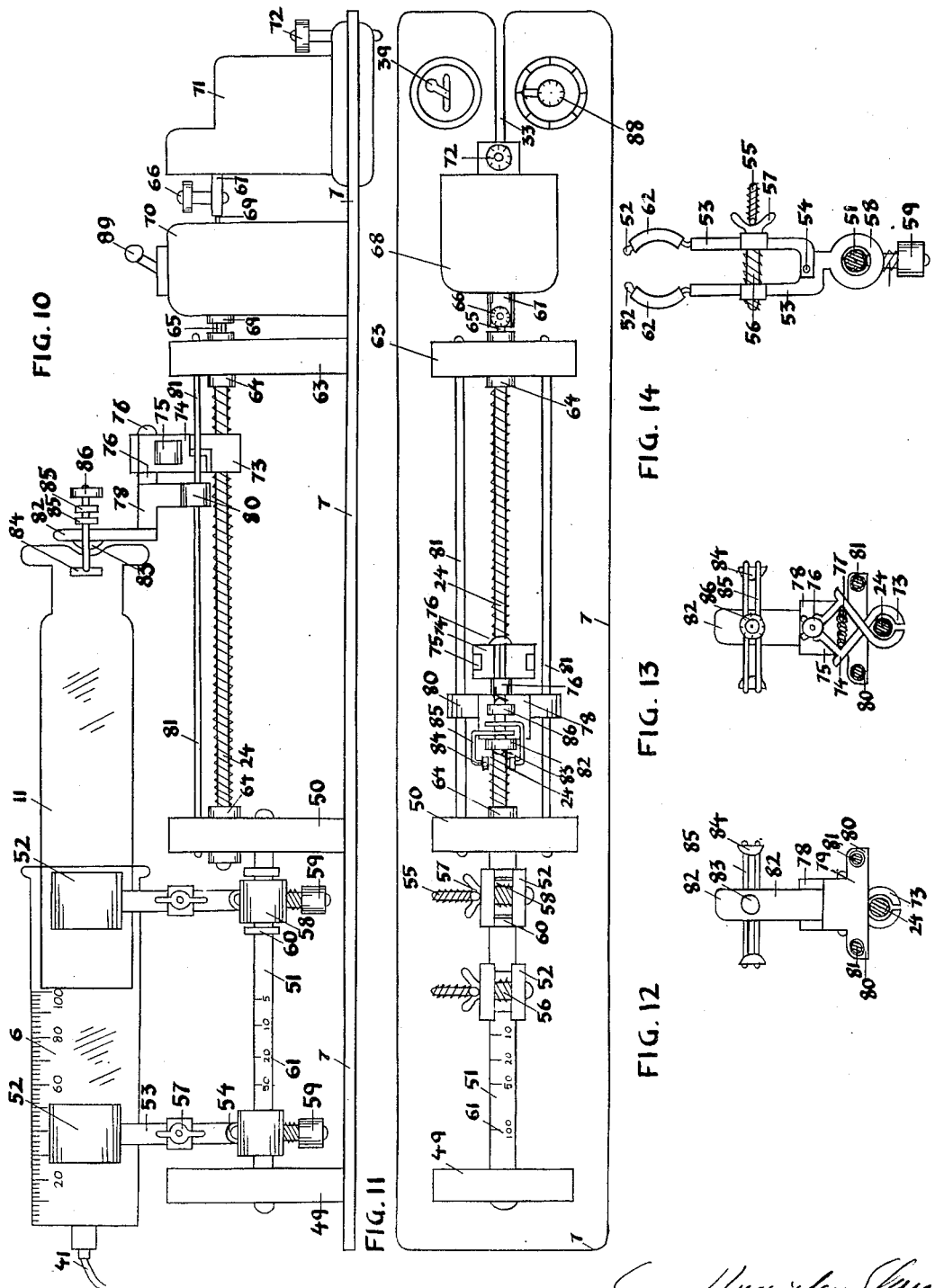

Patented Feb. 28, 1950

2,498,672

UNITED STATES PATENT OFFICE 2,498,672

MOTOR DRIVE FOR MEDICAL SYRINGES

George Bronislaw Glass, New York, N. Y., assignor to Antonina S. Glass, New York, N. Y.

Application May 26, 1947, Serial No. 750,481

6 Claims. (Cl. 128—218)

This invention relates to improvements in automatic means for operating medical or hypodermic syringes and to a combination of such means with one or more medical or hypodermic syringes of standard size and style.

Medical syringes at present in use are generally hand-operated and this limits the use and facility with which an injection of long duration may be administered. Therefore, for such injections use is made of flasks provided with drip devices from which the fluid drips by gravity, but these flasks cannot be used for injections of small amounts of drugs over extended periods of time. There is, nevertheless, frequent need for an injection device which can administer small amounts of drugs over certain extended periods of time, such as in the case of intravenously administered anesthetic drugs during operation, or the injection of some contrasting media preparatory to the taking of X-ray photographs, as well as for the administration of small amounts of drugs that are rapidly destroyed or eliminated from the body and which nevertheless should be maintained at a given concentration in the blood for a definite length of time.

The present invention provides a means of this kind and supplies an automatic device which, save for the preliminary insertion of the needle into the body of the patient, requires no hand operation and is not held by the administrator or physician. To my knowledge there has not heretofore been any satisfactory commercial instrument of this kind on the market.

According to the present invention I provide an apparatus adapted to hold the body of a medical syringe in a stable position, combined with means adapted to impart a desired axial movement at a predetermined slow speed to the plunger of the syringe, whereby solutions or dispersions of drugs or other medicaments may be automatically injected into the body of a patient at a controlled and constant rate.

According to the invention I provide means of the character above referred to which are adapted for use with standard type medical syringes. In one embodiment of my invention the apparatus comprises clamps for holding the barrel or casing of the syringe, supports to which the clamps are secured, and a plunger rod provided with means for engaging the piston of the syringe, a screw-threaded drive shaft associated with the conventional drive shaft of an electric or similar motor, a connecting member connecting the screw-threaded drive shaft to the plunger rod and means for putting the connecting member into and out of operative relationship with the screw-threaded drive shaft. By using a screw-threaded drive shaft of fine pitch, and electric or other motors of fractional horse-power, with or without variable gear transmissions or other such controls, extremely slow drug injections can be automatically administered at substantially any desired rate.

The invention will be better understood from the following description of the particular embodiments of it which are illustrated in the accompanying drawings, in which:

Fig. 3 shows a side view of the apparatus as set up for use with a relatively small medical syringe and shows the use of a governor-controlled electric motor;

Fig. 4 is a top plan view of a similar apparatus to that illustrated in Fig. 3;

Fig. 5 is a part sectional view of the interchangeable supporting clamp taken along the line 5—5 of Fig. 3;

Fig. 6 is a front view of a supporting clamp for a large size syringe as used in the apparatus illustrated in Fig. 1;

Fig. 7 is a fragmentary view of a modified form of the connecting member connecting the plunger rod of the driving mechanism to the drive shaft;

Fig. 8 is a front view of the modified device illustrated in Fig. 7;

Fig. 9 is a side view of the same member showing in more detail its association with the plunger rod and drive shaft;

Fig. 10 is a side elevation of a further modification of the apparatus shown in combination with an electric motor, a variable gear transmission and a large size medical syringe in the positions assumed at the beginning of an injection.

Fig. 11 is a top plan view of the apparatus illustrated in Fig. 10, without the speed-changing mechanism, but with a rheostat and with the propelling mechanism in the position it assumes at the end of an injection.

Fig. 12 is a front view of the propelling and connecting member employed in the modification illustrated in Figs. 10 and 11;

Fig. 13 is a rear view of the part illustrated in Fig. 12;

Fig. 14 is a front view of a supporting arm and clamp as used in the modification illustrated in Figs. 10 and 11 for clamping the syringe casing in place.

Figure 1:
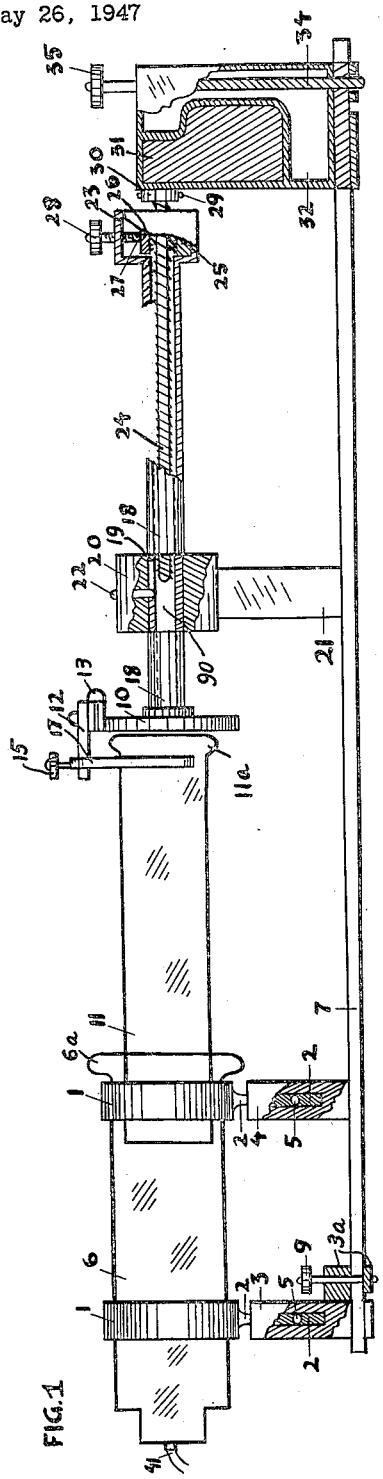
Fig. 1 is a side elevation, partly in section, of one embodiment of the invention which is particularly adapted for use with large medical syringes and it shows the relative arrangement of the parts of the device and of the syringe at the beginning of an injection.
Figure 2:
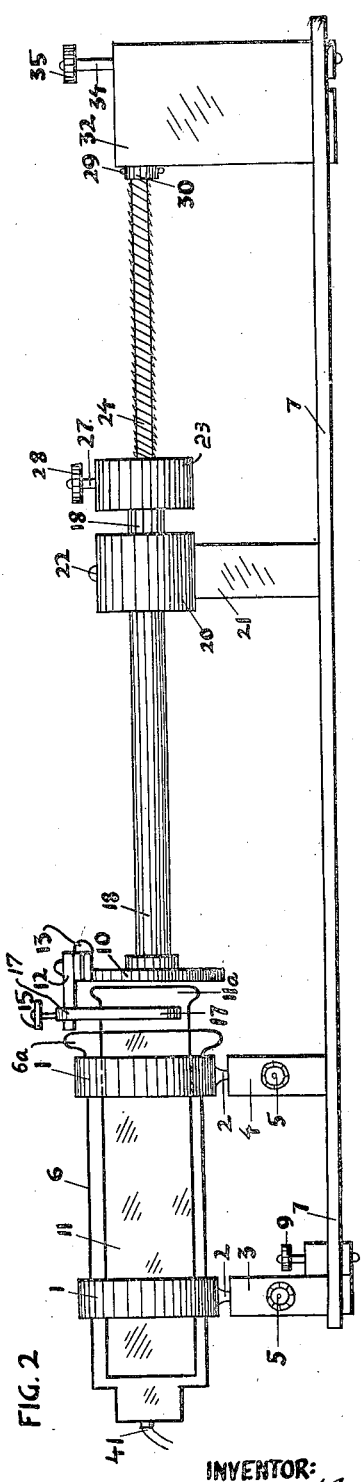
Fig. 2 is a side elevation of the apparatus illustrated in Fig. 1 showing the relative position of the parts at the conclusion of an injection.

Referring first to the modification illustrated in Figs. 1 to 6, the apparatus comprises a base plate 7 provided with slots 8 and 8a running inwardly from each end, and which act as runways within which, at the front end, a clamp 1, together with its supporting member 3, may be moved to accommodate syringes of different lengths, while the rear slot 8a is similarly employed to allow for the longitudinal positioning of the electric motor 32, in accordance with the needs governed by the size of the syringe employed and the predetermined length of travel of the syringe piston.

Each of the clamp members, of which two are shown for securing the syringe barrel or casing, comprises a split ring 1 secured to an arm 2 which in turn is received in a correspondingly sized recess provided in a supporting member 3 and secured therein by means of screw 5. The rear of the two clamps has a supporting block 4 which is rigidly secured to the base 7, while the front clamp has its supporting block 3 attached to extension 3a, the supporting block 3 and the extension 3a extending below the bottom of the base plate 7 and being of greater width than the slot 8 so as to be slidably movable along the slot 8 and to be secured therealong in any desired position by means of screw 9.

The barrel or casing 6 of a hypodermic syringe with its flared end of yoke piece 6a is received in the two clamps 1, the size of the latter and their position relative to each other along the base plate 7 being selected to accommodate the requirements for a balanced holding of the syringe 6. The piston 11 of the syringe with its customarily flanged or enlarged end 11a is supported in operation by two gripping members 17 secured by a cross-bar 16 (Fig. 4) and screw 15 to plate 12 which is hinged by hinge 13 to the plunger rod head 10 secured to the plunger rod 18 of the propelling mechanism. The plate 12 is slotted as at 14 to allow adjustment therealong of the grips 17.

The plunger rod 18 is provided along its upper surface with a longitudinally extending slot 19 as shown in Fig. 4 and is provided with a longitudinally extending bore 90 (Fig. 1) disposed throughout its whole length and in which a screw-threaded drive shaft 24 is free to travel. The plunger rod 18 is prevented from rotating during its forward movement by means of a pin 22 riding in the channel 19; the pin 22 is screwed into the top of bearing 20 through which the plunger rod 18 passes, the bearing 20 being rigidly secured to the base plate 7 by support 21.

To the rear of the plunger rod 18 an integral connecting member is provided, which in Figs. 1 to 4, takes the form of a casing 23 provided in its lower half with a screw-threaded segment 25 that meshes with the screw-threaded drive shaft 24; the upper half of the casing 23 is provided with a screw-threaded portion 26 meshing with the drive shaft 24, which portion 26 is secured to a screw-threaded shaft 27 associated with a nut 28 which can, at will, be put into or withdrawn from meshing engagement with the screw-threaded shaft 24.

The drive shaft 24 at its rear end is secured by screws 29 and collar 30 to the output drive shaft of an electric or other motor 31 supported in housing 32 which by means of screw 34 and nut 36 is adjustably secured along the slot 8a to the base plate 7.

In Figs. 3 and 4 a governor-controlled electric motor 87 is shown and in these two figures electric leads 36, plug 37, socket 38 and switch 39 illustrate the connection between the electric motor and the power line 40.

Fig. 5 shows a supporting clamp as used in Figs. 3 and 4 for supporting a small syringe and in Figs. 3 and 4 relative initial positions of the supporting clamps 1 and the electric motor housing 32 are established for use with small syringes. The clamps holding the syringe can be replaced by releasing the screw 5 and withdrawing arm 2 with the attached clamp 1 and replacing it with another clamp of the desired size. Thus in Fig. 6 a larger clamp is illustrated as can be used for the large syringes illustrated in drawings of Figs. 1 and 2.

In operation the modification illustrated in Figs. 1 to 6 functions as follows: The syringe 6 with its piston 11 is mounted in the clamps 1, a hypodermic needle attached to outlet tubing 41 of the syringe is inserted in the body of the patient and the end of the syringe piston 11 is secured in the grip 17, this grip device being shown in inoperative position in Fig. 3 and in operative contact with the syringe piston 11 in Figs. 1 and 2. The speed of injection is determined and the speed of the electric motor 31 established accordingly, the screw 27 of the connecting member 23 is turned to bring the screw-threaded portion 26 into mesh-contact with the drive shaft 24, the switch 39 is turned on and the injection allowed to proceed. By choosing a screw-thread of fine pitch for the drive shaft 24 and if necessary additionally adjusting the speed of rotation of the drive shaft, as by interposing a reducing gear mechanism and the like, an extremely slow injection over an extended period of time can be maintained. It is unnecessary for the syringe to be held in the hand at any time. Furthermore the apparatus is designed for use with syringes of the standard kind and which are readily purchased in the market.

When the piston 11 has completed its full stroke, or whenever it is desired to interrupt the injection, the motor is switched off, the grips 17 released from engagement with the head of the syringe piston by pulling on knob 15 to rotate the plate 12 about hinge 13, so that this attachment assumes the position shown in Fig. 3. Then screw 28 is turned counter-clockwise to raise the threaded segment 26 of the connecting member 23 from out of meshing engagement with the threaded drive shaft 24. The bore provided in the plunger rod 18 being of somewhat larger diameter than the drive shaft 24 and a certain amount of play also existing in the bearing 20, the operator can disengage the lower part 25 of the connecting member 23 from meshing engagement with the drive shaft 24, by simply exerting a slight downward pressure on the knob 28 so that the plunger rod is slightly bent out of alignment with the drive shaft 24. The entire plunger rod with its front and rear attachments is then readily withdrawn to the rear or initial position by hand and the apparatus is again ready for use in the next injection.

In the modification illustrated in Figs. 10 and 14 the base plate 7 is slotted only at its rear end 33 for relative positioning of the electric motor 71. At its forward end the clamps 52 are secured by arms 53, pin 54, boss 58 and screw 59 around a bar 51 which is supported by standards 49 and 50 that are rigidly secured to the base plate 7. The front clamp 52 is adjustable along the bar 51, which may carry a scale 61, whereas the rear clamp 52 is not adjustable along the bar 51 but is secured in one position by flanges 60 provided on the bar 51. The clamps 52 may be turned somewhat along the bar 51 for adjustment in alignment with the syringe barrel by releasing nut 59. By longitudinal adjustment of the front clamp member 52, syringe casings 6 of varying lengths can be properly accommodated. To the rear of the standard 50, drive shaft 24 is journalled in bushings 64, one being secured to the standard 50 and the other to a rear standard 63. Guide rails 81 also secured to standards 50 and 63 are provided above and laterally of the screw-threaded drive shaft 24 for the guiding control during travel of a modified connecting and propelling device which is illustrated in some detail in Figs. 12 and 13.

The connecting and propelling device illustrated in Figs. 10 to 13 comprises an internally screw-threaded member 73 meshing with the drive shaft 24. The member 73 is in the form of a split nut, each sector of which extends to form cross-arms 74 having rectangular extending projections pivotally secured to a rectangular bar 78 by pinion 76, said arms 74 being continuously pressed apart by coil spring 77 and adapted to be brought together by manual pressure of the fingers in the recessed portion 75 to compress the spring 77 and to disengage the split nut portion 73 from engagement with the drive shaft 24.

The rectangular bar 78 at its base is secured to or formed with a transverse segment 79 having bore cuffs 80 through which the guide rods 81 continuously pass. The rectangular bar 78 is provided with a relatively narrow vertical propelling bar 82 depressed at its front end and provided in its upper part with a small convexity 83 adapted to engage with the conventional concavity in the head of the syringe piston 11. The propelling bar 82 is provided with two grasps 84 mounted on two parallel segments 85, whose relative positions are adjustable to the size of the piston 11 of the syringe with which they engage. The adjustment of the segments 85 is effected by suitable release of the screw 86.

The drive shaft 24 has a non-threaded extension 65 secured to the drive shaft 67 of a motor 68 by means of screw 66 (Fig. 11); a variable gear transmission 70 with adjustable switch 89 can be interposed between the motor 68 and the drive shaft extension 65, if desired, as shown in Fig. 10. Electric motor 68 is contained in the housing 71 and adjustably secured in the slot 33 of the base plate 7 by means of a screw 72. In Fig. 11, 88 represents a rheostat which can be employed for regulating the speed of the electric motor instead of the variable gear transmission represented by 70 in Fig. 10.

Fig. 14 illustrates in greater detail the style of clamp used to hold the piston barrel 6 in the modification shown in Fig. 10. The relative position of the two arms 53 may be adjusted by means of a wing nut 57 on the screw 55 in counter-action to spring 56. Rubber grips 62 are provided for contact with the syringe casing.

In operation, the modification illustrated in Figs. 10 to 14 is similar to that described in reference to the modification illustrated in Figs. 1 to 6. The connecting member 73 travels on the drive shaft 24 and propels the member 78 along the guide rails 81 to cause the propelling bar 82 to cause the piston 11 to move axially forward into the syringe casing 6.

The normal procedure is to switch off the motor at the end of its stroke, disengage the grips 84 from the syringe piston by releasing screw 86, disengage connecting member 73 from drive shaft 24 by finger and thumb pressure on recessed portions 75 of the connecting member and manually withdraw the whole connecting and propelling member 73 back to its initial or rear position along the drive shaft 24. The guide rods 81 constantly maintain the connecting and propelling member 73 in the desired upright and stable relationship to the drive shaft 24.

A modification of a further suitable connecting member associating the drive shaft 24 with the plunger rod 18 is illustrated in Figs. 7 to 9. In this modification the connecting device comprises a split, internally-threaded nut 42 adapted to encompass and mesh with the screw-threaded drive shaft 24, each section 42 being integral with arcuate pincer-like members 43 connected at their lower ends by spring 48 and pivoted to rod 46 by pinion 44; rod 46 bears against extension 47 secured to the end of the plunger rod 18 (Fig. 9). The arms 43 of the pincer arrangement extend upwardly to conclude in handles or grips 45. The sections 42 lie normally in juxtaposition in mesh with the threaded drive shaft 24 and this connecting member can be released at will from engagement with the drive shaft 24 by squeezing the grips 45 together as shown in Fig. 8 to disengage sections 42 from drive shaft 24 and to allow the entire connecting unit to be pulled back manually together with the plunger rod 18.

The motor preferably used is an electric motor of fractional horse-power such as a synchronous timing motor of a permanent magnet type and having a constant rate of revolution and provided with a gear-speed reducing unit adapted to reduce the rate of revolutions from one to ten R. P. M. Other motors such as capacitor motors, shade pole motors, series-wound fractional horse-power motors may be employed. Conventional electrical speed-varying devices, such as rheostats and governor controls can be used or conventional reducing gear mechanism may be interposed between the electric motor and the drive shaft of the apparatus. Obviously it is possible to substitute one kind of motor for another as desired and, in addition, a series of similar devices may be erected on one base and driven simultaneously from one motor or operated individually from separate motors. All connecting devices and clamping arrangements shown in each of the foregoing illustrated modifications can be interchanged as desired.

By way of illustration, use can be made of an electric motor arranged to transmit eight revolutions per minute to the drive shaft, the latter being threaded to the extent of 20 threads per inch to result in a forward movement of the syringe plunger at a constant speed of about 1 cm. per minute. The piston of a 5 cc. syringe has an approximate length of 4 cm. and at this rate it completes its full stroke in four minutes, whereas the piston of a 100 cc. syringe, which has a length of about 11 cm., has a time of travel of 11 minutes at this rate. This is fairly good range of speed for a slowly performed intravenous injection but if a drip injection is to be done and is to extend over a period of several hours, a motor having a range of speed of four to eight revolutions per hour may be used. With such a motor the above kind of syringes will be emptied in from 4 to 22 hours, depending on the size of the syringe used.

Various modifications may be introduced as will be obvious to those skilled in the art to control the rate and extent of injections performed by this device. The advantage of having fully automatic injection mechanism of this kind is very considerable and is of great utility to the medical profession.

Since many variants may be obviously introduced into the features of this invention without departing from the spirit and scope thereof, it is to be understood that the modifications shown in the accompanying drawings are to be interpreted in an illustrative rather than in a limiting sense.

I claim:

1. In a device for automatically operating a medical syringe, which syringe comprises a syringe barrel and piston, a base, means for rigidly holding the syringe barrel secured to a stationary portion of the device, a plunger rod head, means for releasably engaging said head with the syringe piston, a plunger rod attached to said plunger rod head, a bearing for said plunger rod, means for preventing rotation of said plunger rod during axial travel thereof, a motor, a housing for a motor secured to said base, an axially disposed screw-threaded drive shaft parallel to said plunger rod and journalled to said motor, means for changing the rate of rotation of the drive shaft, a connecting member operatively connecting said plunger rod and said screw-threaded drive shaft and movable co-axially but not rotatably with the latter, said connecting member comprising a casing secured to the rear end of the plunger rod, an internally screw-threaded split nut surrounding and meshing with the screw-threaded drive shaft housed in said casing, and means for disengaging said split nut from meshing engagement with said screw-threaded drive shaft.

2. In a device for automatically operating a medical syringe, which syringe comprises a syringe barrel and piston, a base, means for rigidly holding the syringe barrel secured to a stationary portion of the device, a propelling member, means for releasably engaging said propelling member with the syringe piston, guide means for said propelling member secured to a stationary portion of the device and extending longitudinally for preventing rotation of said propelling member during axial travel thereof, a motor, a housing for said motor secured to said base, an axially disposed screw-threaded drive shaft journalled to said motor, bearings for said screw-threaded drive shaft secured to a stationary portion of the device, means for changing the rate of rotation of said drive shaft, a connecting member operatively connecting said propelling member and said drive shaft and movable co-axially but not rotatably with the latter, said connecting member comprising a casing secured to the propelling member, an internally threaded split nut surrounding and meshing with the screw-threaded drive shaft and attached to said casing, and means for disengaging said split nut from meshing engagement with said screw-threaded drive shaft.

3. In a device for automatically operating a medical syringe, which syringe comprises a syringe barrel and piston, a base, clamp members for rigidly holding the syringe barrel to said base, means for adjusting the relative positions of said clamp members according to the size of the syringe, a plunger rod head, releasable grasps secured to said head operatively engaging the syringe piston, a plunger rod connected to said plunger rod head and having an external longitudinally extending slot, a tubular passageway in said plunger rod, a plunger rod bearing secured to said base in which the plunger rod is free to move axially, a pin mounted in said bearing and riding in said slot to prevent rotational movement of the plunger rod during axial travel thereof, an axially extending screw-threaded drive shaft disposed to ride rotatably in part within the passageway in the plunger rod, a motor, a housing for said motor secured to said base, guide means for moving said housing axially along said base, means connecting said screw-threaded drive shaft to said motor, means for changing the rate of rotation of the drive shaft, and a connecting member for releasable engagement of said plunger rod with said screw-threaded drive shaft and movable co-axially but not rotatably with the latter, said connecting member comprising a casing secured to the plunger rod, an internally-threaded split nut disposed around and adapted to mesh with said screw-threaded drive shaft, and a screw passing through said casing and secured to one section of said split nut.

4. In a device for automatically operating a medical syringe, which syringe comprises a syringe barrel and piston, a base, clamp members for rigidly holding the syringe barrel to said base, means for adjusting the relative positions of said clamp members according to the size of the syringe, a plunger rod head, releasable grasps secured to said head operatively engaging the syringe piston, a plunger rod connected to said plunger rod head and having an external longitudinally extending slot, a tubular passageway in said plunger rod, a plunger rod bearing secured to said base in which the plunger rod is free to move axially, a pin mounted in said bearing and riding in said slot to prevent rotational movement of the plunger rod during axial travel thereof, an axially extending screw-threaded drive shaft disposed to ride rotatably in part within the passageway of the plunger rod, a motor, a housing for said motor secured to said base, guide means for moving said housing axially along said base, means connecting said screw-threaded drive shaft to said motor, means for changing the rate of rotation of the drive shaft, and a connecting member for releasable engagement of said plunger rod with said screw-threaded drive shaft and movable co-axially but not rotatably with the latter, said connecting member comprising a spring-actuated and internally-threaded split nut meshing with said screw-threaded drive shaft, extensions on the split nut portions forming cross arms journalled to said plunger rod, and means for manually releasing said split nut from engagement with said screw-threaded drive shaft.

5. In a device for automatically operating a medical syringe, which syringe comprises a barrel and a piston, a base, clamp members for rigidly holding the syringe barrel to said base, means for adjusting the relative positions of said clamp members according to the size of the syringe, a propelling member, releasable grasps secured to said propelling member operatively engaging the syringe piston, longitudinally-extending guide means for said propelling member secured to said base for preventing rotation of said propelling member during axial travel thereof, a motor, a housing for said motor secured to said base, an axially disposed screw-threaded drive shaft journalled to said motor, bearings for said drive shaft secured to said base, means for changing the rate of rotation of the screw-threaded drive shaft and a connecting member for securing releasable engagement of said propelling member with said screw-threaded drive shaft and movable co-axially but not rotatably with the latter, said connecting member comprising a casing secured to the propelling member, an internally-threaded split nut disposed around and adapted to mesh with said screw-threaded drive shaft, and a screw passing through said casing and secured to one section of said split nut.

6. In a device for automatically operating a medical syringe, which syringe comprises a barrel and a piston, a base, clamp members for rigidly holding the syringe barrel secured to said base, means for adjusting the relative positions of said clamp members according to the size of the syringe, a propelling member, releasable grasps secured to said propelling member operatively engaging the syringe piston, longitudinally extending guide means for said propelling member secured to said base for preventing rotation of said propelling member during axial travel thereof, a motor, a housing for said motor secured to said base, an axially disposed screw-threaded drive shaft journalled to said motor, bearings for said drive shaft secured to the base, means for changing the rate of rotation of the screw-threaded drive shaft, and a connecting member for releasable engagement of said propelling member and said screw-threaded drive shaft and movable co-axially but not rotatably with the latter, said connecting member comprising a spring-actuated and internally-threaded split nut meshing with said screw-threaded drive shaft, extensions on the split nut portions forming cross arms journalled to said propelling member, and means for manually releasing said split nut from engagement with said screw-threaded drive shaft.

GEORGE BRONISLAW GLASS.

REFERENCES CITED

The following references are of record in the file of this patent:

UNITED STATES PATENTS

| Number | Name | Date |
| --- | --- | --- |
| 1,988,480 | Campkin | Jan. 22, 1935 |